United States Patent [19]
Tsukamoto et al.

[11] 3,977,769
[45] Aug. 31, 1976

[54] ELECTRO-OPTIC DEVICE

[75] Inventors: Masahide Tsukamoto, Neyagawa; Tetsuro Ohtsuka, Takatsuki; Kazuhisa Morimoto, Settu; Yoshinobu Murakami, Katano, all of Japan

[73] Assignee: Matsushita Electric Industrial Co., Ltd., Japan

[22] Filed: Apr. 22, 1975

[21] Appl. No.: 570,375

[30] Foreign Application Priority Data
May 31, 1974 Japan.............................. 49-62343
June 7, 1974 Japan.............................. 49-65286

[52] U.S. Cl............................. 350/160 LC; 252/299
[51] Int. Cl.²........................ G02F 1/13; C09K 3/34
[58] Field of Search................... 252/299, 408 LC; 350/160 LC

[56] References Cited
UNITED STATES PATENTS

| | | | |
|---|---|---|---|
| 3,776,615 | 12/1973 | Tsukamoto et al. | 252/408 |
| 3,781,088 | 12/1973 | Tsukamoto et al. | 252/408 |
| 3,806,230 | 4/1974 | Haas | 252/299 |
| 3,819,531 | 6/1974 | Saeva et al. | 252/299 |
| 3,891,307 | 6/1975 | Tsukamoto et al. | 350/160 LC |

OTHER PUBLICATIONS

Gray, G. W. et al., Liquid Crystals & Plastic Crystals, vol. 1, Ellis Horwood, Ltd., London, pp. 142–143, 170–171 (Jan. 1974).
de Jeu, W. H. et al., Philips Res. Repts., vol. 27, pp. 172–185 (1972).
Sackmann, Erich; et al. J. Amer. Chm. Soc., vol. 89, No. 23, pp. 5981–5982 (11/8/67).
Berreman, D. W., et al., Physical Rev. Letters, vol. 25, No. 9, pp. 577–581 (8/31/70).

*Primary Examiner*—Benjamin R. Padgett
*Assistant Examiner*—T. S. Gron
*Attorney, Agent, or Firm*—Wenderoth, Lind & Ponack

[57] ABSTRACT

The present invention provides an improved electro-optical device having a cell for containing a liquid crystal and consisting of two light-transparent plates opposed to each other and having electrically conductive electrodes on the inner surfaces thereof, the electrodes on at least one inner surface being transparent and spacer means between said opposed electrodes; and a power supply coupled to said electrodes for applying an electric voltage to said electrodes, whereas the improvement comprises a liquid crystal in said cell between said electrodes consisting of 99.95 to 65 wt.% of at least one nematic liquid crystal and 0.05 to 35 wt.% of at least one optically active compound of the formula:

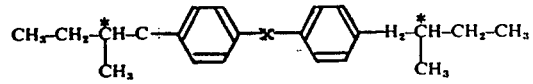

wherein X is —N=N— or

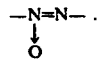

5 Claims, 4 Drawing Figures

ELECTRO-OPTIC DEVICE

This invention relates to an electro-optical device which responds to application of an electric field, and more particularly to an electro-optical device using a cholesteric liquid crystal mixture which consists of at least one nematic liquid crystal and at least one optically active compound and, which has, when incorporated into an electro-optical device, a threshold voltage above which the light transmission of the device changes and responds rapidly to an applied voltage.

Up to the present, many liquid crystal compounds have been developed for use in an electro-optical device, and some of them are on the market. However, these liquid crystals have not been used in matrix display devices because of the disadvantages that they do not have a threshold voltage and have a slow response to an applied voltage. Generally, in a matrix display device, display elements are formed at intersections of a group of strip-shaped electrodes extending in one direction and another group of strip-shaped electrodes extending in the other direction. An image is constructed by applying electric signals to selected electrodes. One example of the structure and the driving method is described in detail, for example, in U.S. Pat. No. 3,776,615.

The matrix display devices have an advantage that the number of lead wires can be less than the number of the display elements. On the other hand, there is a problem of the cross effect which is a phenomena that about half of the applied voltage is undesirably applied to all elements on the selected electrodes except for the element at the intersection of the selected electrodes. This undesired half voltage disturbs the image. For preventing the cross effect, a special liquid crystal is required wherein the light transmission does not change until a certain voltage is applied to the liquid crystal layer between two opposed electrodes. That is, a liquid crystal material is required to have a threshold voltage when incorporated into an electro-optical device. Further, for a matrix display device, rapid response of light transmission to an applied voltage is required since an image on the matrix display device is formed by scanning the display elements rapidly.

It has been known that an electro-optical device using a nematic liquid crystal which exhibit a "dynamic scattering mode" has a threshold voltage. Also, it has been known that an electro-optical device which is known as a "twisted nematic device" has a threshold voltage. However, these devices have only a slow response to an applied voltage. It has been known that an electro-optical device using a cholesteric liquid crystal, which is a mixture of cholesterin derivatives and a nematic liquid crystal having a positive dielectric anisotropy and has a cholesteric-to-nematic phase transition induced by an electric field has both a threshold voltage and a rather rapid response. However, the response is not rapid enough to be employed in the matrix display device.

Further, it has been known that an electro-optical device using a cholesteric liquid crystal, which is a mixture of a nematic liquid crystal and an optically active compound having a molecular structure similar to that of a nematic liquid crystal and has a cholesteric-to-nematic phase transition, also has a rapid response to an applied voltage. The rapidity of the response increases with an increase of the concentration of an optically active compound, that is, with a decrease of the length of the pitch of the helix of the cholesteric phase. However, there is a problem in that, when the pitch is shortened by increasing the concentration of the optically active compound in order to obtain a fast response, the temperature range within which the mixture exhibits a cholesteric phase becomes narrow, or the mixture becomes isotropic or solid. Therefore, a material, which makes the pitch short even though it is present only in a small amount, has been earnestly desired.

An object of the present invention is to provide an improved and novel electro-optical device.

Another object of the invention is to provide an improved electro-optical matrix display device.

A further object of the present invention is to provide an electro-optical device using a cholesteric liquid crystal which has a threshold voltage and a rapid response to an applied voltage and which provides excellent results when used in matrix display devices.

These objects are attained by employing a cholesteric liquid crystal mixture which consists of 99.95 to 65 wt% of at least one nematic liquid crystal and 0.05 to 35 wt% of at least one optically active compound selected from the group consisting of (+)-p,p'-di(2-methylbutyl)azobenzene and (+)-p,p'-di(2-methylbutyl)azoxybenzene. Such an optically active compound does not exhibit a cholesteric mesomorphic (liquid crystal) state.

These and other objects and the features of the present invention will be apparent upon consideration of the following description taken together with the accompanying drawings, wherein.

Optically active compounds used in this invention have two identical optically active side chains and the following formula;

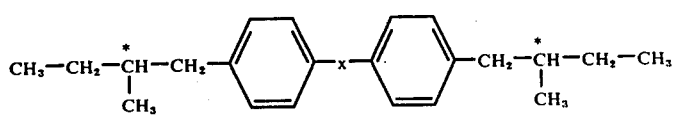

wherein $x$ is $-N=N-$ or

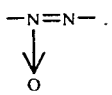

The sign (*) means an asymmetric carbon atom. These compounds do not exhibit a mesomorphic (liquid crystal) phase. These compounds undergo a transition from a solid to an isotropic liquid at a transition temperature shown in Table 1.

Table 1

| X | solid   isotropic liquid |
|---|---|
| —N=N— | 52°C |
| —N=N— ↓ O | 53°C |

These compounds exhibit a cholesteric liquid crystal state when they are mixed with a nematic liquid crystal, and the mixtures have a threshold voltage when incorporated into an electro-optical device.

Nematic liquid crystals are classified into two classes. One is nematic liquid crystals the dielectric constant of which in the direction parallel to the long molecular axis is larger than that in the direction perpendicular to the long molecular axis. They are generally called nematic liquid crystals having a positive dielectric anisotropy. A designation "P-nematic liquid crystals" will be used for such nematic liquid crystals having a positive dielectric anisotropy in the following description. The other one is nematic liquid crystals the dielectric constant of which in the direction parallel to the long molecular axis is smaller than that in the direction perpendicular to the long molecular axis. They are generally called nematic liquid crystals having a negative dielectric anisotropy. A designation "n-nematic liquid crystal" is used for such nematic liquid crystals having a negative dielectric anisotropy in the following description.

Figure 1:
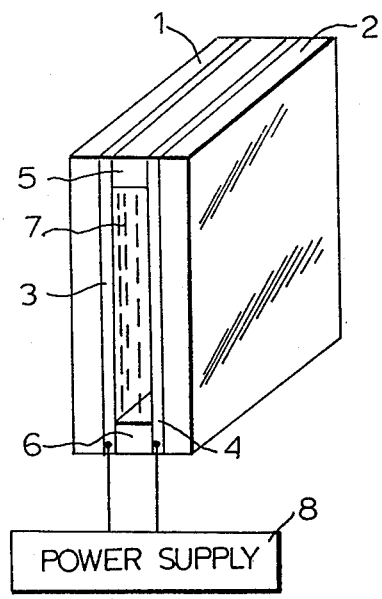
FIG. 1 is a schematic perspective view of a basic structure of an electro-optical device according to the invention.

FIG. 1 shows a basic structure of an electro-optical device of the invention which consists of a cell containing a liquid crystal and a power supply, wherein a liquid crystal layer 7 is sandwiched between two light-transparent plates 1 and 2 which are opposed to each other and having light-transparent and electrically conductive electrodes 3 and 4 on the respective inner surfaces thereof. The thickness of the liquid crystal layer or the distance between the opposed electrodes is determined by spacers 5 and 6. For the light-transparent plate, glass, quartz, plastic or the like is used. The light-transparent electrode is made of $In_2O_3$, $SnO_2$, CuI or the like. The spacer is plastic, glass or the like, and usually it is $5\mu$ to $100\mu$ in thickness. Power supply 8 supplies an electric voltage between the electrodes 3 and 4. Usually, it contains driver circuits, a signal generator and the like. The transmissive-type electro-optical device can be easily changed to a reflective-type electro-optical device by changing the transparent electrode 3 on the plate 2 to a light-reflective electrode. Further, the electro-optical device as shown in FIG. 1 can be easily modified so as to provide a plurality of display elements by dividing the electrode on the each plate into a plurality of electrodes.

Figure 2:
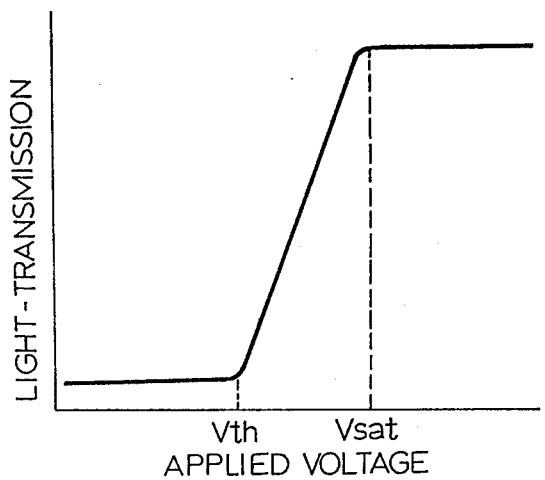
FIG. 2 is a graph showing an electro-optical property of a phase-transition-type cholesteric liquid crystal mixture for explaining the operation of the device of the invention.

The liquid crystal layer 7 of the electro-optical device shown in FIG. 1 contains a mixture of at least one nematic liquid crystal and at least one of the optically active compounds, (+)-p,p'-di(2-methylbutyl)azobenzene or (+)-p,p'-di(2-methylbutyl) azoxybenzene, and the mixture has an electro-optical property as shown in FIG. 2. Referring to FIG. 2, light-transmission of the electro-optical device holds at a low level until an applied voltage, either DC or AC, reaches a threshold voltage Vth, and then light transmission increases steeply as the applied voltage exceeds the threshold voltage Vth and further increases. The transmission saturates at a saturation voltage Vsat and remains at a high constant level when the voltage exceeds the saturation voltage. The abrupt change of the transmission is caused by a cholesteric-to-nematic phase transition induced by an electric field. The state during low transmission is cholesteric and the state during high transmission is nematic. The electro-optical property exists whether the applied voltage is DC or AC. The threshold voltage varies with the change of concentration of the optically active compound and increases with an increase of concentration.

Representative compounds of p-nematic liquid crystals include p-alkoxybenzylidene-p'-cyanoaniline, p-alkylbenzylidene-p'-cyanoaniline, p-cyanobenzylidene-p'-alkoxyaniline, p-cyanobenzylidene-p'-alkylaniline, p-acyloxybenzylidene-p'-cyanoaniline, p-cyanobenzylidene-p'-acyloxyaniline, p-cyanophenyl-p'-alkylbenzoate, p-cyanophenyl-p'-alkoxybenzoate, p-alkylphenyl-p'-cyanobenzoate, p-alkoxyphenyl-p'-cyanobenzoate, p-alkoxybenzylidene-p'-aminobenzene, n-alkyl-p-cyanobenzylidene-p'-aminocinnamate, p-n-alkyl-p'-cyanobiphenyl and p-n-alkoxy-p'-cyanobiphenyl. As a matter of course, mixtures of a plurality of p-nematic liquid crystal compounds as described above are also p-nematic liquid crystal materials and can be employed in the present invention. Further, a mixture of a p-nematic liquid crystal compound and an n-nematic liquid crystal compound which will be described later has the same properties as the p-nematic liquid crystals, and it can be also employed as a p-nematic liquid crystal in the present invention.

In order that the mixture of p-nematic liquid crystal compound and an n-nematic liquid crystal compound be p-nematic, i.e., the mixture of a p-nematic liquid crystal compound and an n-nematic liquid crystal compound has larger mean dielectric constant in the direction of alignment of the molecules, i.e., the direction parallel to the long axis of the molecule, than that in the direction perpendicular to the direction of the alignment of the molecules, the concentration of the p-nematic liquid crystal compound must be limited. For example, in the case of a mixture of p-butoxybenzylidene-p'-cyanoaniline (p-nematic) and p-methoxybenzylidene-p'-n-butylaniline (n-nematic), the concentration of p-butoxybenzylidene-p'-cyanoaniline must be more than 5 mole % in order to obtain a nematic liquid crystal having a positive dielectric anisotropy. Generally, when the optically active compound, either (+)-p,p'-di(2-methylbutyl) azobenzene or (+)-p,p'-di(2-methylbutyl)azoxybenzene, is added to a mixture of a p-nematic and an n-nematic liquid crystal compound, the concentration of the p-nematic liquid crystal compound is required to be more than 5 mole % in order to obtain the cholesteric-to-nematic phase transition.

Representative compounds of n-nematic liquid crystals include p-alkoxy-p'-alkylazoxybenzene, p-alkyl-p'-alkoxyazoxybenzene, p-alkoxy-p'-alkoxyazoxybenzene, p-alkyl-p'-alkylazoxybenzene, p-alkyl-p'-alkoxyazobenzene, p-alkoxy-p'-alkylazobenzene, p-alkyl-p'-alkylazobenzene, p-alkoxy-p'-alkoxyazobenzene, p-alkoxybenzylidene-p'-acyloxyaniline, p-alkylbenzylidene-p'-acyloxyaniline, p-alkylbenzylidene-p'-alkoxyaniline, p-alkoxybenzylidene-p'-alkylaniline, and p-alkyl-p'-acyloxyazoxybenzene. A mixture of a plurality of n-nematic liquid crystals has the same properties as the n-nematic liquid crystals, and it can also be employed as an n-nematic liquid crystal in the present invention. Further, a mixture of a p-nematic liquid crystal compound and an n-nematic liquid crystal compound becomes an n-nematic liquid crystal unless the concentration of the p-nematic liquid crystal compound exceeds the limitation described above.

EXAMPLE 1

A mixture of 85 wt.% of p-n-hexylbenzylidene-p'-cyanoaniline (p-nematic) and 15 wt% of (+)-p,p'-di(2-methylbutyl) azoxybenzene exhibited a cholesteric state. Light-transmission of an electro-optical device with a spacer 6μ thick as shown in FIG. 1 changed abruptly as applied voltage having a rectangular wave form and a frequency of 250 Hz increased. The threshold voltage was 23 volts at 20°C. The rise time was 6 msec when the applied voltage was 35 volts and the decay time was 4 msec, where the rise time is the time required for the cholesteric state to change to the nematic state and the decay time is the time required for the reverse process.

Electro-optical characteristics were examined with variation of the concentration of (+)-p,p'-di(2-methylbutyl) azoxybenzene. When the concentration of (+)-p,p'-di(2-methylbutyl) azoxybenzene was decreased to less than about 1 wt.%, the transmission of the cholesteric state increased, and the abrupt change of the transmission was blurred. Therefore, it was difficult to determine the threshold voltage. However, a device employing a mixture which contained (+)-p,p'-di(2-methylbutyl)azoxybenzene in a concentration less than 1wt.% had a faster decay time than that of a device employing a pure nematic liquid crystal, so long as the concentration of (+)-p,p'-di(2-methylbutyl)azoxybenzene was not less than 0.05 wt%. A concentration of more than 35 wt.% of (+)-p,p'-di(2-methylbutyl)azoxybenzene resulted in a high threshold voltage of more than about 70 volts which tended to cause breakdown of the electro-optical device. Therefore, a concentration of more than 35 wt% is undesirable for practical use.

The cholesteric helical pitch of the mixture of the example 1 was 0.33μ at 30°C. The pitch decreased with an increase of the concentration of (+)-p,p'-di(2-methylbutyl) azoxybenzene. The value 0.33μ for the pitch is very small compared with that of a mixture containing another optically active compound which has been used conventionally, instead of (+)-p,p'-di(2-methylbutyl)azoxybenzene of the invention.

EXAMPLE 2

A mixture of 85 wt.% of p-n-hexylbenzylidene-p'-cyanoaniline (p-nematic) and 15 wt.% of (+)-p,p'-(2-methylbutyl)azobenzene exhibited a cholesteric state. The threshold voltage of an electro-optical device with a spacer 6μ thick as shown in FIG. 1 was 25 volts at 20°C when alternating voltage having a rectangular wave form and a frequency of 250 Hz was applied. The rise time was 5 msec when the applied voltage was 30 volts and the decay time was 4 msec. The pitch of the helix was 0.38μ at 28°C.

EXAMPLE 3

A mixture of 30 wt.% of p-butoxybenzylidene-p'-cyanoaniline (p-nematic), 62 wt.% of p-methoxybenzylidene-p'-n-butylaniline and 8 wt% of (+)-p,p'-di(2-methylbutyl)azoxybenzene had a cholesteric state. When the mixture was incorporated into an electro-optical device with a spacer 6μ thick, the threshold voltage was 12 volts at 20°C. The rise time was 55 msec when the applied voltage was 20 volts and the decay time was 25 msec. The pitch of the helix was 0.62μ at 30°C.

As can be understood from the examples 1, 2 and 3, because the concentration of (+)-p,p'-di(2-methylbutyl)azoxybenzene or (+)-p,p'-di(2-methylbutyl)azobenzene required for getting a desirable pitch or threshold voltage is small, it is possible to prevent narrowing of the temperature range of the cholesteric phase and an increase in the viscosity of the mixture which results in a slow response. As described hereinbefore, a concentration more than 35 wt% of (+)-p,p'-di(2-methylbutyl)azoxybenzene or (+)-p,p'-di(2-methylbutyl)azobenzene results in a high threshold voltage of more than 70 volts which tends to cause breakdown of the electro-optical device, and is undesirable for practical use. In order to obtain an excellent performance, it is preferable to use a mixture having a concentration of 2 wt.% to 35Wt% of (+)-p,p'-di(2-methylbutyl) azoxybenzene or (+)-p,p'-di(2-methylbutyl)azobenzene.

Figure 3:
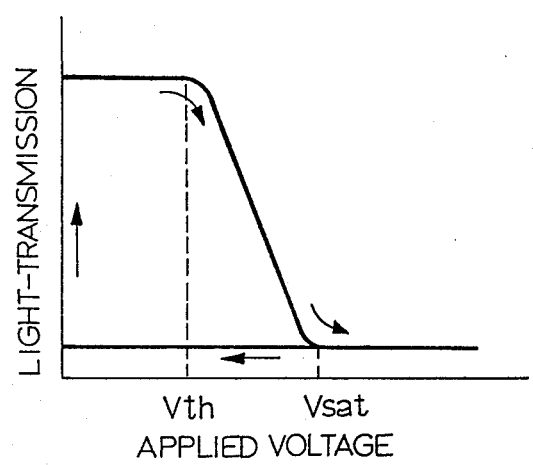
FIG. 3 is a graph showing an electro-optical property of a memory type cholesteric liquid crystal mixture for explaining the operation of the device of the invention.

An electro-optical device employing a mixture of at least one n-nematic liquid crystal and at least one of the optically active compounds (+)-p,p'-di(2-methylbutyl)azoxybenzene and (+)-p,p'-di(2-methylbutyl)azobenzene, had an electro-optical property as shown in FIG. 3, and it had a memory property of a low transmission state after removal of the applied voltage.

Referring to FIG. 3, light-transmission of the electro-optical device is high before an electric voltage is applied and holds the high level until the applied voltage, either DC or AC at a frequency below a cut-off frequency, reaches a threshold voltage Vth. Then, light-transmission decreases steeply as the applied voltage exceeds the threshold voltage and further increases. The transmission saturates at a saturation voltage Vsat and remains at a low constant level when the voltage exceeds the saturation voltage. When the applied voltage is decreased from the saturation voltage, the state of low transmission remains, and even when the applied voltage is removed, the state of the low transmission remains. The low transmission state can be turned back to the initial light-transmission state by applying a voltage having a frequency higher than the cut-off frequency. The cut-off frequency depends on the properties of the liquid crystal, such as viscosity, electric conductivity and dielectric constant, and temperature. Usually, the value of the cut-off frequency is from about 10 Hz to a few KHz.

EXAMPLE 4

A mixture of 85 wt.% of p-methoxybenzylidene-p'-n-butylaniline (n-nematic) and 15 wt.% of (+)-p,p'-di(2-methylbutyl)azoxybenzene had a cholesteric state. An electro-optical device with a spacer 12μ thick as shown in FIG. 1 and containing this mixture had a threshold voltage of 36 volts at 20°C when alternating voltage of rectangular waveform and frequency having a 50 Hz was applied. The rise time was 10 msec when the applied voltage was 40 volts, and the cut-off frequency was 166 Hz. When alternating voltage of 75 volts of rectangular waveform and frequency having a 1300 Hz was applied, the low-transmission state returned to the high-transmission state within an erase time of 1.5 sec.

EXAMPLE 5

A mixture of 85 wt.% of p-methoxybenzylidene-p'-n-butylaniline and 15 wt.% of (+)-p,p'-di(2-methylbutyl)azobenzene had a cholesteric state. An electro-optical device with a spacer 12μ thick and containing this mixture had a threshold voltage of 35 volts at 20°C when an alternating voltage having a rectangular waveform and a frequency of 33 Hz. was applied. The rise time was 15 msec when the applied voltage was 75 volts, and the cut-off frequency was 145 Hz. When alternating voltage of 75 volts having a rectangular waveform and a frequency of 500 Hz was applied, the erase time was 800 msec.

The memory property disappeared gradually with a decrease of the concentration of (+)-p,p'-di(2-methylbutyl) azoxybenzene or (+)-p,p'-di(2-methylbutyl)azobenzene, and the device tended to exhibit dynamic scattering, a well known phenomenon for n-nematic liquid crystals.

Although an electro-optical device containing a mixture having a low concentration of (+)-p,p'-di(2-methylbutyl)azoxybenzene or (+)-p,p'-di(2-methylbutyl)azobenzene did not have the memory property, the device exhibited a more abrupt change of transmission than that of a device containing a pure n-nematic liquid crystal, when the applied voltage was increased. This effect could be obtained in a mixture having a concentration of more than 0.05 wt.% of (+)-p,p'-di(2-methylbutyl)azoxybenzene or (+)-p,p'-di(2-methylbutyl)azobenzene. An electro-optical device employing a mixture having a concentration of more than 35 wt.% of (+)-p,p'-di(2-methylbutyl)azoxybenzene or (+)-p,p'-di(2-methylbutyl)azobenzene had a long erase time and a low transmission, after an alternating voltage having of a frequency above the cut-off frequency is applied. It is preferable to use a mixture of a few wt.% to 30 wt % of (+)-p,p'-di(2-methylbutyl)azoxybenzene or (+)-p,p'-di(2-methylbutyl)azobenzene in order to obtain an excellent performance.

It is apparent from the above description that a mixture of 99.5 to 65 wt.% of at least one nematic liquid crystal and 0.05 to 35 wt.% of at least one of the optically active compounds, (+)-p,p'-di(2-methylbutyl)azoxybenzene and (+)-p,p'-di(2-methylbutyl) azobenzene has excellent properties when used in an electro-optical device. In order to obtain still better properties, non-liquid crystal compounds can be added to the mixture of the present invention in a limited amount as long as the mixture retains its liquid crystal state. For example, by the addition of a small amount of p-n-alkylbenzylidene-p'-n-alkylaniline, the solid-to-liquid crystal transition temperature is lowered and response to an applied voltage is made rapid. Further, for adjusting electrical conductivity, a small amount of organic electrolyte can be added. For example, it is well known to control the electrical conductivity of a liquid crystal by adding a small amount of a trimethylammoniumhalide, and the addition of such a compound is also effective for the liquid crystals used in the present invention.

Figure 4:
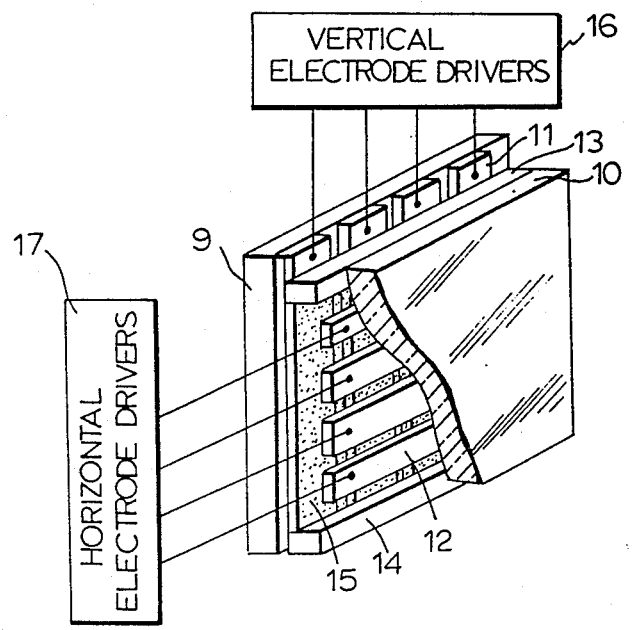
FIG. 4 is a perspective view, partially broken away, of a matrix display device according to the invention.

FIG. 4 is a perspective view, partially broken away, of a matrix display device employing the present invention, wherein the liquid crystal layer 15 is a mixture of at least one nematic liquid crystal and at least one optically active compound as described above, and layer 15 is sandwiched between two light transparent plates 9 and 10 having light-transparent strip-shaped electrodes 11 and 12 on the inner surfaces thereof. The direction of the strip-shaped electrodes on one plate 9 is perpendicular to that of the strip-shaped electrodes on the other plate 10. Spacers 13 and 14 determine the thickness of the liquid crystal layer 15.

For displaying images, the vertical strip-shaped electrodes 11 on the plate 9 and the horizontal strip-shaped electrodes 12 on the plate 10 are excited by voltage signals produced by vertical electrode drivers 16 and horizontal electrode drivers 17. Various methods for application of voltage signals for displaying images are well known to those skilled in the art. Since a display element at an intersection of a vertical electrode and a horizontal electrode in the matrix display device of the present invention undergoes an abrupt change of light-transmission above a threshold voltage and rapid response to an applied voltage, as described hereinbefore, no cross effect, which blurs images, is produced and fast scanning can be employed so as to produce flicker-free images.

The shape of the vertical and horizontal electrodes in FIG. 4 can be changed to other shapes for changing the square shape of the display elements to other shapes. For example, the shape of the vertical and horizontal electrodes can be changed in such a manner that the intersections of the vertical and horizontal electrodes form well-known 7-segment numerals.

The transmissive type matrix display device as shown in FIG. 4 can be easily modified to a reflective type matrix display device by changing the transparent electrodes 11 on the plate 9 to light-reflective electrodes.

As described hereinbefore, the present invention provides a novel electro-optical device having a relatively low threshold voltage and rapid response. Further, the matrix display device of the present invention has a good performance.

Although the invention has been described in detail with respect to various preferred embodiments, it is not restricted to them. Modification and variation are possible which are within the spirit of the invention and the scope of the claims.

What we claim is:

1. In an electro-optical matrix display device having a cell containing a liquid crystal composition exhibiting a cholesteric to nematic phase transition upon applied voltage, which cell comprises two light-transparent opposed plates having a plurality of strip-shaped electrodes on the inner surfaces thereof, the direction of the strip electrodes on one of said plates intersecting that of the strip electrodes on the other said plate so as to provide a plurality of display elements at the intersections, the strip electrodes on at least one of said inner surfaces being transparent, and a spacer between said opposed electrodes; and a power supply coupled to said electrodes for applying an electric voltage to said electrodes, the improvement wherein the liquid crystal composition in said cell between said electrodes comprises 99.95 to 65 wt.% of at least 1 nematic liquid crystal and 0.05 to 35 wt.% of at least one optically active compound having two identical optically active side chains and having the formula:

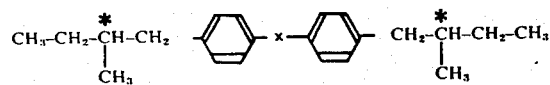

wherein X is —N=N— or

2. An electro-optical device as claimed in claim 1, wherein said nematic liquid crystal has a positive dielectric anisotropy.

3. An electro-optical device as claimed in claim 1, wherein said nematic liquid crystal has a negative dielectric anisotropy.

4. An electro-optical device as claimed in claim 1, wherein said strip-shaped electrodes on one of said plates are light-reflective.

5. An electro-optical device as claimed in claim 1, wherein said plurality of said display elements form 7-segment numerals.

* * * * *